United States Patent
Lu et al.

(10) Patent No.: US 11,513,036 B1
(45) Date of Patent: Nov. 29, 2022

(54) SYSTEMS AND METHODS FOR UNDERBODY INSPECTION OF A MOVING VEHICLE WITH A SMARTPHONE

(71) Applicant: Ford Global Technologies, LLC, Dearborn, MI (US)

(72) Inventors: Jianbo Lu, Northvile, MI (US); Yifan Chen, Ann Arbor, MI (US); Meghna Menon, Rochester Hills, MI (US); Kurt Michael Lundeen, Wixom, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 17/320,126

(22) Filed: May 13, 2021

(51) Int. Cl.
  *G01M 17/007* (2006.01)
  *B60W 50/14* (2020.01)
  *G07C 5/08* (2006.01)

(52) U.S. Cl.
  CPC .......... *G01M 17/007* (2013.01); *B60W 50/14* (2013.01); *G07C 5/0825* (2013.01); *B60W 2050/146* (2013.01); *G06T 2207/30248* (2013.01); *G06T 2207/30252* (2013.01)

(58) Field of Classification Search
  None
  See application file for complete search history.

(56) References Cited

U.S. PATENT DOCUMENTS

| | | | | |
|---|---|---|---|---|
| 6,856,344 B2 * | 2/2005 | Franz | ................ | G01N 21/8806 348/143 |
| 8,155,384 B2 * | 4/2012 | Chew | ................ | G01V 5/0008 382/104 |
| 8,594,979 B2 * | 11/2013 | Icove | ................ | G01V 3/15 73/866.5 |

(Continued)

FOREIGN PATENT DOCUMENTS

| | | | | |
|---|---|---|---|---|
| AU | 2020256221 A1 | * | 11/2021 | .......... G01M 17/007 |
| CN | 107864310 A | * | 3/2018 | .............. G01V 8/10 |

(Continued)

OTHER PUBLICATIONS

Comm Port Technologies Inc., "Under Vehicle Scanning—By Comm Port", CPAS Under Vehicle Scanning System (UVSS), https://www.mssdefence.com/project/comm-port-under-vehicle-scanning/, Copyright MSSDefence 2019, Dec. 5, 2020, 6 pages.

*Primary Examiner* — Kevin R Steckbauer
(74) *Attorney, Agent, or Firm* — Brandon Hicks; Eversheds Sutherland (US) LLP (57) ABSTRACT

Systems and methods that allow a smartphone to be used as an imaging device for undercarriage inspection of a moving vehicle are provided. The method may include locating the smartphone on the ground via one or more sensors of the vehicle. The vehicle may generate a path for the vehicle to drive over the smartphone based on the location of the smartphone, and optionally display the path to facilitate manual driving of the vehicle by the driver over the smartphone. Alternatively, the vehicle may self-drive to follow the path. The smartphone may capture image data indicative of the undercarriage of the vehicle, inspect and analyze the image data to identify one or more issues of the undercarriage of the vehicle, and transmit the analyzed image data to the vehicle for display. The driver may confirm the one or more issues and transmit the data to an inspection professional for additional assistance if needed.

20 Claims, 9 Drawing Sheets

(56) References Cited

U.S. PATENT DOCUMENTS

| | | | |
|---|---|---|---|
| 9,244,133 B2* | 1/2016 | Icove | G01V 3/15 |
| 10,445,874 B2* | 10/2019 | Prabhu | G06T 7/70 |
| 10,482,347 B2* | 11/2019 | Uffenkamp | G06T 3/4038 |
| 10,671,867 B2* | 6/2020 | Duckworth | G06F 17/18 |
| 10,823,877 B2* | 11/2020 | Petruk | H04N 5/2256 |
| 10,893,213 B2* | 1/2021 | Magnuszewski | G03B 15/06 |
| 11,119,585 B2* | 9/2021 | Chen | G06F 1/1686 |
| 11,225,153 B2* | 1/2022 | Prasad | B60L 53/126 |
| 11,263,742 B2* | 3/2022 | Megherby | G06T 7/0008 |
| 11,341,684 B1* | 5/2022 | Robinson | G06T 7/80 |
| 2007/0040911 A1* | 2/2007 | Riley | H04N 7/181 348/E7.086 |
| 2012/0147190 A1 | 6/2012 | Ioli | |
| 2016/0148073 A1* | 5/2016 | Uffenkamp | G06T 5/009 348/148 |
| 2017/0372147 A1 | 12/2017 | Stervik et al. | |
| 2018/0137614 A1* | 5/2018 | Prabhu | G06T 7/001 |
| 2019/0235126 A1* | 8/2019 | Petruk | H04N 7/183 |
| 2019/0235644 A1* | 8/2019 | Chen | H04N 5/2628 |
| 2020/0082188 A1* | 3/2020 | Singh | G08B 25/016 |
| 2020/0125871 A1* | 4/2020 | Duckworth | G06N 20/00 |
| 2020/0168065 A1* | 5/2020 | Cassimy | H04N 7/183 |
| 2020/0322545 A1* | 10/2020 | Magnuszewski | H04N 5/2254 |
| 2020/0322546 A1* | 10/2020 | Carolus | H04N 5/2254 |
| 2021/0237594 A1* | 8/2021 | Prasad | G07C 5/08 |
| 2021/0241377 A1* | 8/2021 | Megherby | G06V 20/20 |
| 2021/0241438 A1* | 8/2021 | Megherby | B25J 9/1664 |
| 2022/0089042 A1* | 3/2022 | Prasad | B60W 30/095 |

FOREIGN PATENT DOCUMENTS

| | | | | |
|---|---|---|---|---|
| CN | 108627348 A | * | 10/2018 | G01M 17/007 |
| CN | 111352123 A | * | 6/2020 | G01M 17/007 |
| CN | 113108218 A | * | 7/2021 | E01F 1/00 |
| DE | 102013212495 A1 | * | 12/2014 | B60R 1/00 |
| DE | 102017214994 A1 | * | 2/2019 | G01M 17/007 |
| DE | 102020216406 A1 | * | 12/2021 | G06K 9/00832 |
| EP | 3308356 A1 | * | 4/2018 | G06T 7/0002 |
| EP | 3308356 A4 | * | 12/2018 | G06T 7/0002 |
| EP | 3308356 B1 | * | 4/2020 | G06T 7/0002 |
| FR | 3062725 A1 | * | 8/2018 | E01F 13/123 |
| JP | 2018073019 A | * | 5/2018 | G01V 8/10 |
| KR | 2031946 B1 | * | 10/2019 | G01P 3/38 |
| WO | WO-2014206888 A1 | * | 12/2014 | B60R 1/00 |
| WO | WO-2016199171 A1 | * | 12/2016 | G06T 7/0002 |
| WO | WO-2018071019 A1 | * | 4/2018 | G06F 1/1626 |
| WO | WO-2019114321 A1 | * | 6/2019 | G01V 8/10 |
| WO | WO-2019143754 A1 | * | 7/2019 | G01V 8/10 |
| WO | 2020206142 A1 | | 10/2020 | |
| WO | WO-2020206142 A1 | * | 10/2020 | G01M 17/007 |
| WO | WO-2021158785 A1 | * | 8/2021 | B25J 19/023 |

* cited by examiner

SYSTEMS AND METHODS FOR UNDERBODY INSPECTION OF A MOVING VEHICLE WITH A SMARTPHONE

BACKGROUND

Inspecting a vehicle's undercarriage onsite, e.g., at the customer's driveway, is a major challenge as the vehicle cannot easily or efficiently be lifted as it would be in a repair shop. While camera-based inspection technologies have been developed, there is a lack of commercially-available, cost-effective tools and systems for undercarriage self-inspections. It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Disclosed are systems and methods that allow a smartphone to be used as an imaging device for undercarriage inspection of a moving vehicle. The system uses an intelligent inspection application on a smartphone to communicate with an intelligent application on the vehicle to conduct undercarriage inspection, which involves the following tasks: the vehicle's inspection application utilizes the car's DAT sensor, e.g., forward facing camera, to locate the smartphone on the ground, and plans a clear path towards the smartphone to display on the car's human-machine interface (HMI). The user/driver drives the vehicle to follow through the path to pass over the location of the smartphone to allow the smartphone to perform the inspection. The smartphone may use its camera and the intelligent inspection application to take undercarriage images, conduct semantic segmentation, and/or spot undercarriage problem(s). The smartphone may then transmit, e.g., beam, the information to the vehicle's HMI for the user/driver to review.

In some embodiments, the vehicle may be equipped with automated driving features, e.g., auto parking, such that the vehicle's intelligent inspection application may cause the vehicle to autonomously drive through the path to pass over the smartphone on the ground to conduct inspection. If the vehicle's DAT sensor set is not able to located the smartphone on the ground, the vehicle's inspection application may request the smartphone to use the undercarriage picture to locate the phone's location with respect to the vehicle's path and to estimate the desired path for the vehicle to follow. Accordingly, a user/driver with a suspicion on their vehicle's well-being may conduct this undercarriage inspection at home.

ILLUSTRATIVE EMBODIMENTS

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Figure 1:
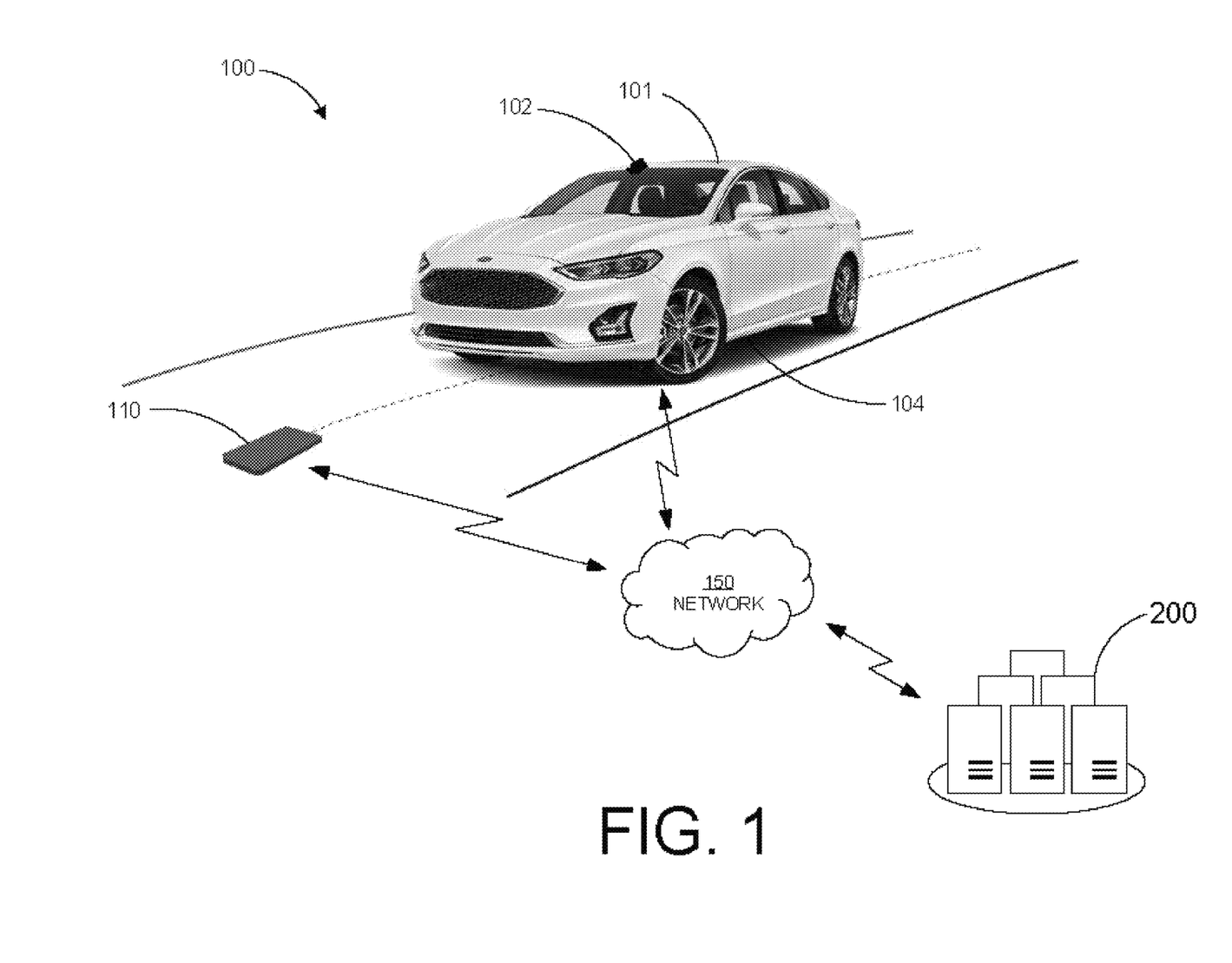
FIG. 1 illustrates an exemplary system for performing an undercarriage inspection of a vehicle with a smartphone in accordance with the principles of the present disclosure.

Referring now to FIG. 1, undercarriage inspection system 100 is described. System 100 may include vehicle 101 and mobile device 110, communicatively coupled to undercarriage inspection platform 200 via, e.g., network 150. Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, cellular, near-field communication (NFC), Wi-Fi, Wi-Fi direct, machine-to-machine communication, man-to-machine communication, and/or a vehicle-to-everything (V2X) communication.

Vehicle 101 may be a manually driven vehicle (e.g., no autonomy) and/or configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4. A vehicle having a Level-0 autonomous automation may not include autonomous driving features. An autonomous vehicle (AV) having Level-1 autonomy may include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. In some aspects, with Level-2 autonomous features and greater, a primary user may control the vehicle while the user is inside of the vehicle, or in some example embodiments, from a location remote from the vehicle but within a control zone extending up to several meters from the vehicle while it is in remote operation. Level-3 autonomy in a vehicle can provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomous vehicles can operate independently from a human driver, but may still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls. According to embodiments of the present disclosure, undercarriage inspection platform 200 may be configured and/or programmed to operate with a vehicle having a Level-4 or Level-5 autonomous vehicle controller.

Vehicle 101 may include one or more sensors 102, e.g., DAT sensors, forward facing camera(s), LiDAR sensors, etc., configured to detect objects such mobile device 110, and generate data indicative of the detection/location of mobile device 110. Moreover, vehicle 101 includes undercarriage 104, which may be visualized externally underneath vehicle 101.

Undercarriage inspection platform 200 may be located on one or more servers, e.g., on a cloud server, and/or embedded in the vehicle control system of vehicle 101. Undercarriage inspection platform 200 may be accessed via an intelligent inspection application running on either the vehicle control system of vehicle 101 or mobile device 110, or both.

Mobile device 110 may be, for example, a smartphone or a tablet. Moreover, mobile device 110 includes an image recording device, e.g., one or more cameras. Preferably, mobile device 110 may capture high resolution imaging, e.g., at least 12 MP, operate in low light conditions, and further may zoom in and out both optically and digitally. Mobile device 110 may utilize its processors to process and analyze image data captured via its one or more cameras to thereby inspect the undercarriage of vehicle 101, as described in further detail below. Alternatively, or additionally, mobile device 110 may execute a vast array of Application Programming Interfaces (APIs) and/or Integration Development Kits (IDKs) from Original Equipment Manufacturers (OEMs) to facilitate development of imaging applications using the image data captured via the one or more cameras of mobile device 110.

Figure 2:
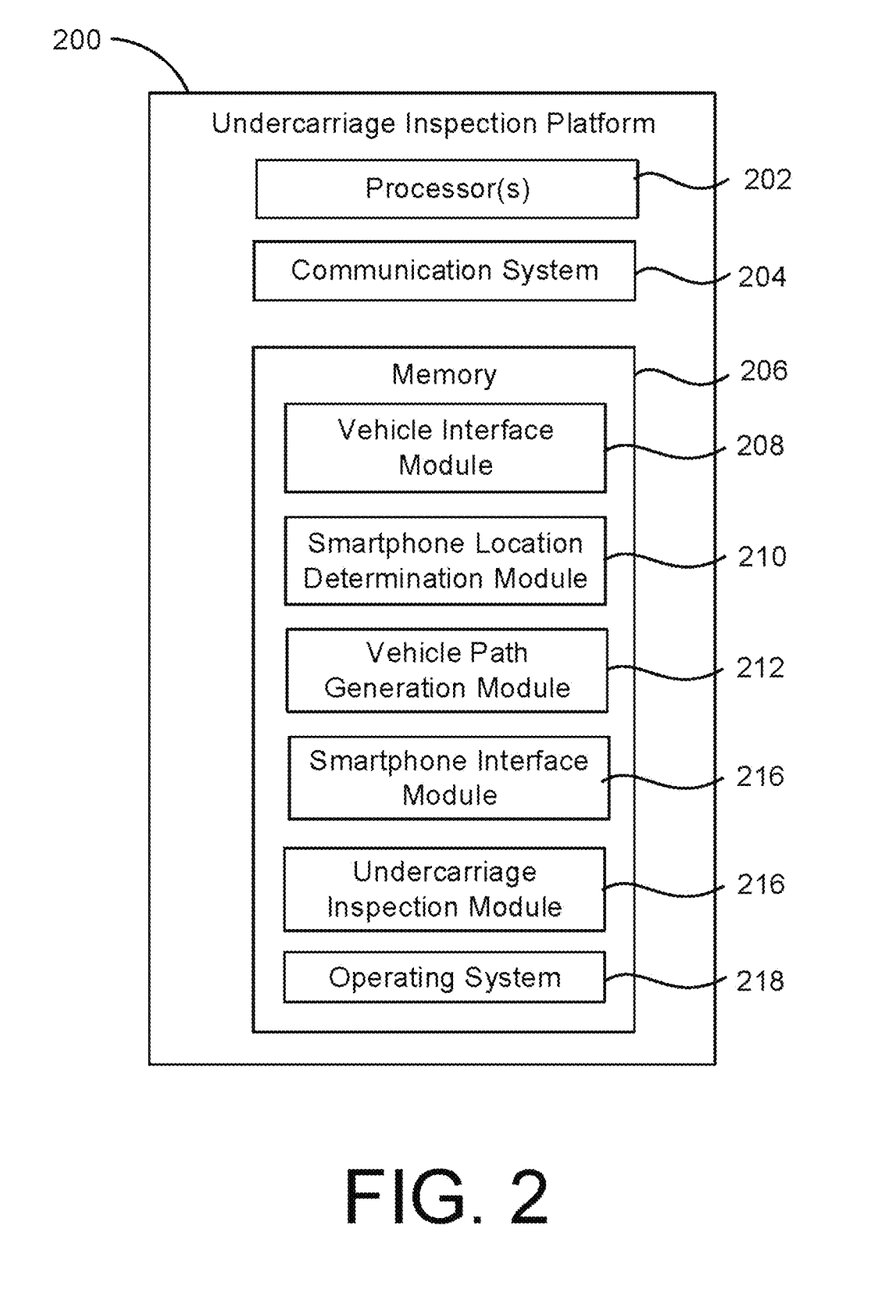
FIG. 2 shows some example components that may be included in an undercarriage inspection platform in accordance with the principles of the present disclosure.

Referring now to FIG. 2, components that may be included in undercarriage inspection platform 200 are described in further detail. Undercarriage inspection platform 200 may include one or more processors 202, communication system 204, and memory 206. Communication system 204 may include a wireless transceiver that allows undercarriage inspection platform 200 to communicate with vehicle 101 and mobile device 110. The wireless transceiver may use any of various communication formats, such as, for example, an Internet communications format, or a cellular communications format.

Memory 206, which is one example of a non-transitory computer-readable medium, may be used to store operating system (OS) 218, vehicle interface module 208, smartphone location determination module 210, vehicle path generation module 212, smartphone interface module 214, and undercarriage inspection module 216. The modules are provided in the form of computer-executable instructions that may be executed by processor 202 for performing various operations in accordance with the disclosure.

Memory 206 may include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, memory 206 may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). The computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Vehicle interface module 208 may be executed by processor 202 for interfacing with an intelligent inspection application running on the vehicle control system of vehicle 101. Accordingly, the user/driver may interact with undercarriage inspection platform 200, e.g., provide user input, using the intelligent inspection application running on the vehicle control system via, e.g., the HMI of vehicle 101. In addition, vehicle interface module 208 may receive data indicative of the detection/location of mobile device 110 from one or more cameras 102 of vehicle 101. For example, when mobile device 110 is positioned on the ground in front of vehicle 101, one or more forward facing cameras of vehicle 101 may capture image data including the location of mobile device 110 on the ground, which may be received by vehicle interface module 208. Moreover, vehicle interface module 208 may transmit data to be displayed on a display of the vehicle control system, e.g., the path generated as described in further detail below and/or the undercarriage inspection images. For example, vehicle interface module 208 may transmit data to the SYNC system of vehicle 101 via, e.g., Smart Device Link, after which the SYNC touchscreen displays the HMI for controlling the imaging operation by the user/driver.

Smartphone location determination module 210 may be executed by processor 202 for determining the location of mobile device 110 relative to vehicle 101 based on the image data received by vehicle interface module 208.

Figure 5A:
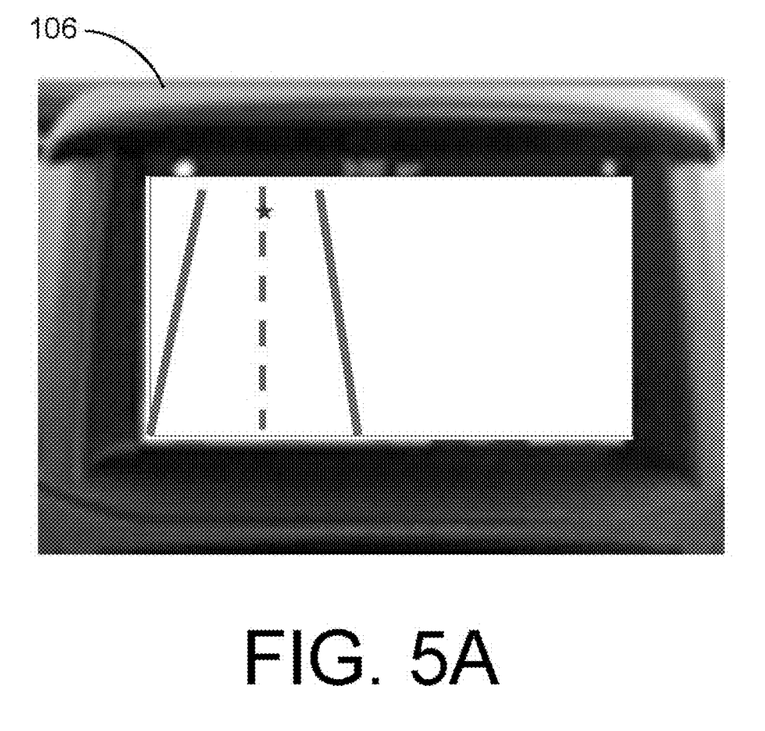
FIGS. 5A to 5C illustrate various displays of the vehicle in accordance with the principles of the present disclosure.

Vehicle path generation module 212 may be executed by processor 202 for generating a path for vehicle 101 to safely drive over mobile device 110 based on the location of mobile device 110 determined by smartphone location determination module 210. Moreover, vehicle interface module 208 may transmit data indicative of the path determined by vehicle path generation module 212 for display on the HMI of vehicle 101, as shown in FIG. 5A. Accordingly, the driver of vehicle 101 may drive vehicle 101 to follow the path displayed. Vehicle path generation module 212 may continuously generate the path based on the location of vehicle 101 and mobile device 110, such that the data indicative of the path may be transmitted to vehicle 101 in real-time. For example, if the driver drives vehicle 101 along a path that deviates from the determined path, vehicle path generation module 212 may generate an adjusted path for the driver to follow in order to drive over mobile device 110. The determined path further may include a recommended driving speed, such that the displayed data on the HMI of vehicle 101 may indicate to the driver if the driver is driving too fast over mobile device 110, e.g., if the speed of vehicle 101 exceeds the recommended driving speed. Accordingly, vehicle interface module 208 may receive one or more parameters of vehicle 101 from the vehicle control system such as velocity and/or acceleration of vehicle 101. If vehicle 101 is self-driving, vehicle interface module 208 may transmit data indicative of the path determined by vehicle path generation module 212 to the vehicle control system of vehicle 101 such that vehicle control system causes vehicle 101 to self-drive to follow the path over mobile device 110.

Smartphone interface module 214 may be executed by processor 202 for interfacing with an intelligent inspection application running on mobile device 110. Accordingly, the user/driver may interact with undercarriage inspection platform 200, e.g., provide user input, using the intelligent inspection application running on mobile device 110. In addition, smartphone interface module 214 may receive image data from mobile device 110, e.g., image data indicative of undercarriage 104 of vehicle 101. In addition, smartphone interface module 214 further may receive audio data from mobile device 110. Moreover, smartphone interface module 214 may transmit a request to mobile device 110 to provide location data of mobile device 110 relative to vehicle 101 based on image data of undercarriage 104, e.g., when mobile device 110 is no longer detected via one or more sensors 102 such as well mobile device 110 is underneath vehicle 101 and out of range of sensors 102.

Figure 5B:
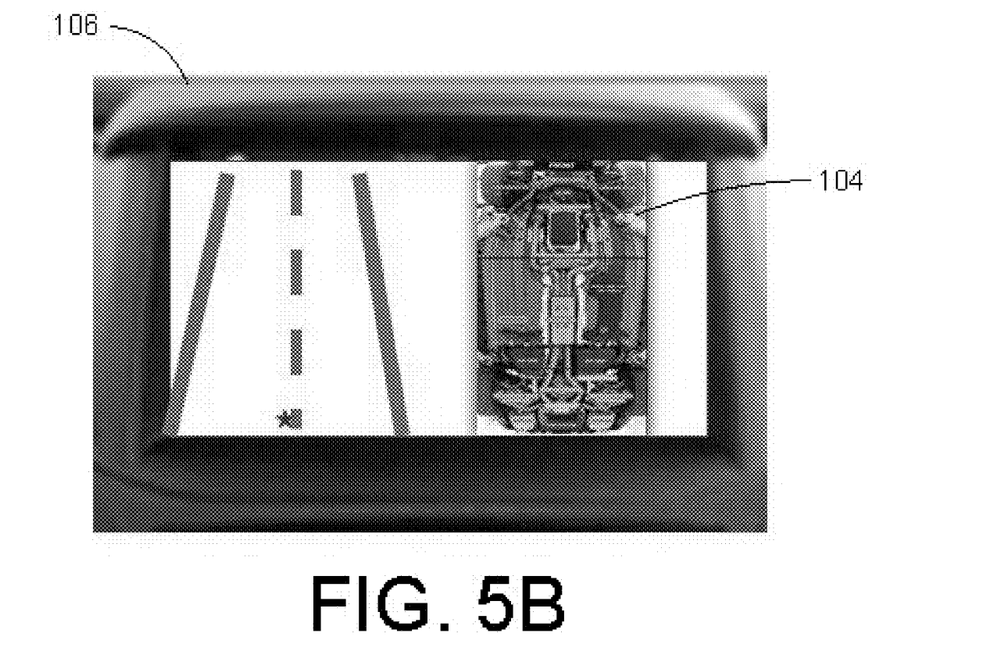
Figure 5C:
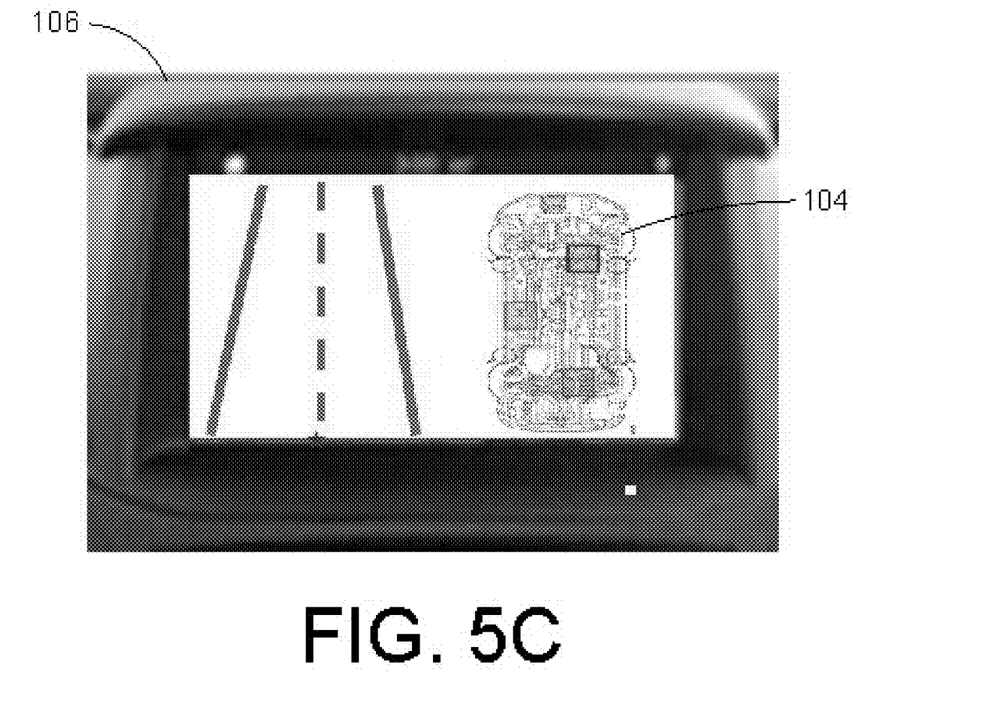

Undercarriage inspection module 216 may be executed by processor 202 for processing and analyzing the image data of undercarriage 104 of vehicle 101 captured by the one or more cameras of mobile device 110, e.g., when vehicle 101 is driven over mobile device 110. For example, undercarriage inspection module 216 may stitch the image data through keypoint matching to generate a full image of undercarriage 104. Moreover, undercarriage inspection module 216 may conduct semantic segmentation on the image data and/or audio data of undercarriage 104, and spot undercarriage problem(s). For example, undercarriage inspection module 216 may be trained with labeled examples of functional and dysfunctional vehicle components, as well as examples of normal and dysfunctional vehicle sounds. In some embodiments, the same network used for semantic segmentation may also be trained with labeled examples of functional and dysfunctional vehicle components. In addition to outputting component labels, undercarriage inspection module 216 may output a likelihood of dysfunction for each component. Components with high likelihoods of dysfunction imply potential problem areas. Accordingly, vehicle interface module 208 may transmit data indicative of the undercarriage problem(s) to be displayed on the HMI of vehicle 101, as shown in FIGS. 5B and 5C. In some embodiments, undercarriage inspection module 216 may be executed via the processors onboard mobile device 202 via the intelligent inspection application on mobile device 110.

Figure 3:
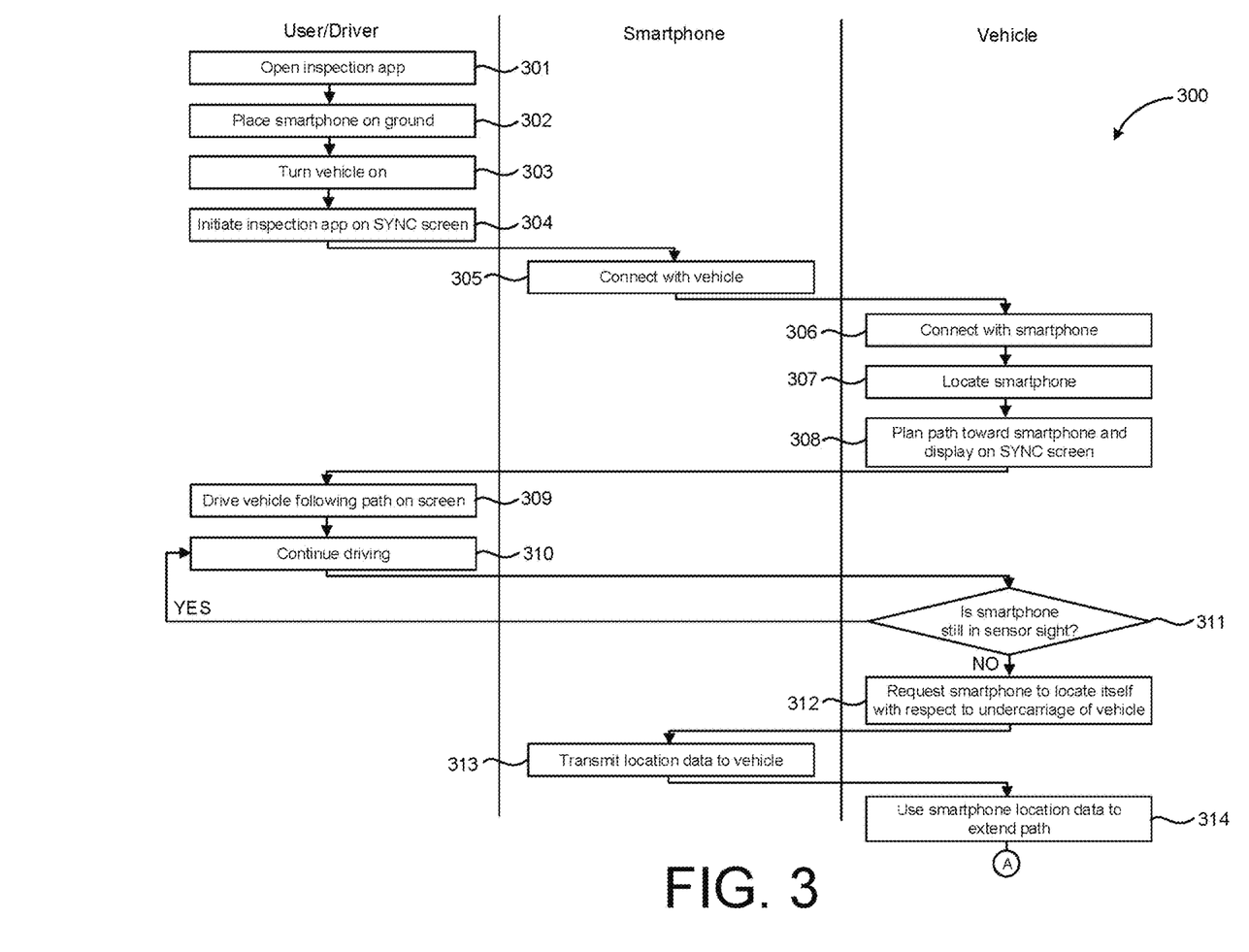
FIG. 3 is a flow chart illustrating exemplary steps for performing an undercarriage inspection of a vehicle with a smartphone in accordance with the principles of the present disclosure.

Referring now to FIG. 3, exemplary method 300 for performing an undercarriage inspection of vehicle 101 with mobile device 110 is provided. Specifically, method 300 requires a driver to manually drive vehicle 100, as described in further detail below. At step 301, the user/driver may open/initiate the intelligent inspection application on mobile device 110. At step 302, the user may place mobile device 110 on the ground, e.g., in front of vehicle 101, such that mobile device 110 is in range of one or more sensors 102 of vehicle 101. At step 303, the user may turn on vehicle 101. At step 304, the user may open/initiate the intelligent inspection application on vehicle 101, e.g., on the SYNC screen of vehicle 101 via the HMI. At step 305, mobile device 110 may connect/pair with vehicle 101, e.g., over network 150. Accordingly, at step 306, vehicle 101 may connect/pair with mobile device 110, e.g., over network 150.

At step 307, vehicle 101 may locate mobile device 110 using one or more cameras 102 of vehicle 101. As described above, smartphone location determination module 210 may determine the location of mobile device 110 based on the data received by vehicle interface module 208 from cameras 102. At step 308, vehicle path generation module 212 may generate a path for vehicle 101 to follow to drive over mobile device 110. The path may be displayed on the SYNC screen of vehicle 101 via the HMI, as shown in FIG. 5A. At step 309, the user/driver may drive vehicle 101 to follow the path, e.g., as indicated by the SYNC screen of vehicle 101. At step 310, the driver may continue driving vehicle 101 over mobile device 110. As described above, the path displayed may be adjusted if the driver drives vehicle 101 on a deviated path, so that the driver may follow the adjusted path to sufficiently drive over mobile device 110. Moreover, information may be displayed to the driver indicating whether the driver is driving vehicle 101, e.g., too fast, so that the driver may drive vehicle 101 at the appropriate speed over mobile device 110.

At step 311, undercarriage inspection platform 200 determines whether mobile device 110 is still within the sensor sight of vehicle 101, e.g., within the range of one or more sensors 102. If it is determined that mobile device 110 is still within the sensor sight of vehicle 101, the driver may continue to drive vehicle 101 at step 310. If it is determined that mobile device 110 is no longer within the sensor sight of vehicle 101, at step 312, vehicle 101 may transmit a request to mobile device 110 for location data of mobile device 110 relative to vehicle 101, e.g., based on image data of undercarriage 104 captured by the one or more cameras of mobile device 110 while vehicle 101 is over mobile device 110. At step 313, mobile device 110 may transmit the location data to vehicle 101 as requested. At step 314, vehicle path generation module 212 may generate an extended path for the driver of vehicle 101 to follow based on the location data of mobile device 110. The extended path is also displayed on the HMI of vehicle 101.

At step 315, mobile device 110 may conduct inspection and analysis of the image data captured by the one or more cameras of mobile device 110. For example, undercarriage inspection module 216 may conduct, e.g., semantic segmentation to spot undercarriage problem(s). At step 316, mobile device 110 may continue to conduct inspection and analysis of the image data. At step 317, undercarriage inspection platform 200 determines whether vehicle 101 has completely driven over mobile device 110, e.g., if the cameras of mobile device 110 identifies the rear end of vehicle 101. If the rear end of vehicle 101 is not yet seen by the cameras of mobile device 110, the inspection and analysis of the image data captured by mobile device 110 continues at step 316. If the rear end of vehicle 101 is seen/detected by the cameras of mobile device 110, at step 318, mobile device 110 may transmit a termination signal to vehicle 101.

The driver of vehicle 101 may continue driving at step 319 until the termination signal is received by vehicle 101. At step 320, undercarriage inspection platform 200 may determine whether vehicle 101 has received the termination signal from mobile device 110. If the termination signal has not been received by vehicle 101, the driver may continue driving vehicle 101 at step 319. If the termination signal has been received by vehicle 101, a notification may be displayed on the HMI of vehicle 101, such that the driver may see the notification and stop driving vehicle 101 at step 321.

At step 322, mobile device 110 may transmit the analyzed image data of undercarriage 104 to vehicle 101, e.g., by beaming the analyzed image data to vehicle 101, for display. At step 323, vehicle 101 may receive the analyzed image data from mobile device 110, and display the data, e.g., via the HMI of the SYNC screen, as shown in FIG. 5B. Alternatively, or additionally, the analyzed image data may be displayed on mobile device 110. At step 324, the HMI of vehicle 101 may prompt the user/driver to select or confirm problems detected of undercarriage 104 as displayed. The user/driver may select/confirm the problems via HMI as shown in FIG. 5C. At step 325, the HMI of vehicle 101 may ask the user/driver whether the user/driver wants to save the analyzed image data and/or transmit the data to an inspection professional, e.g., the dealership. At step 326, the user/driver may exit vehicle 101, and pick up mobile device 110 from the ground at step 327. At step 328, the undercarriage inspection cycle is complete.

Figure 4:
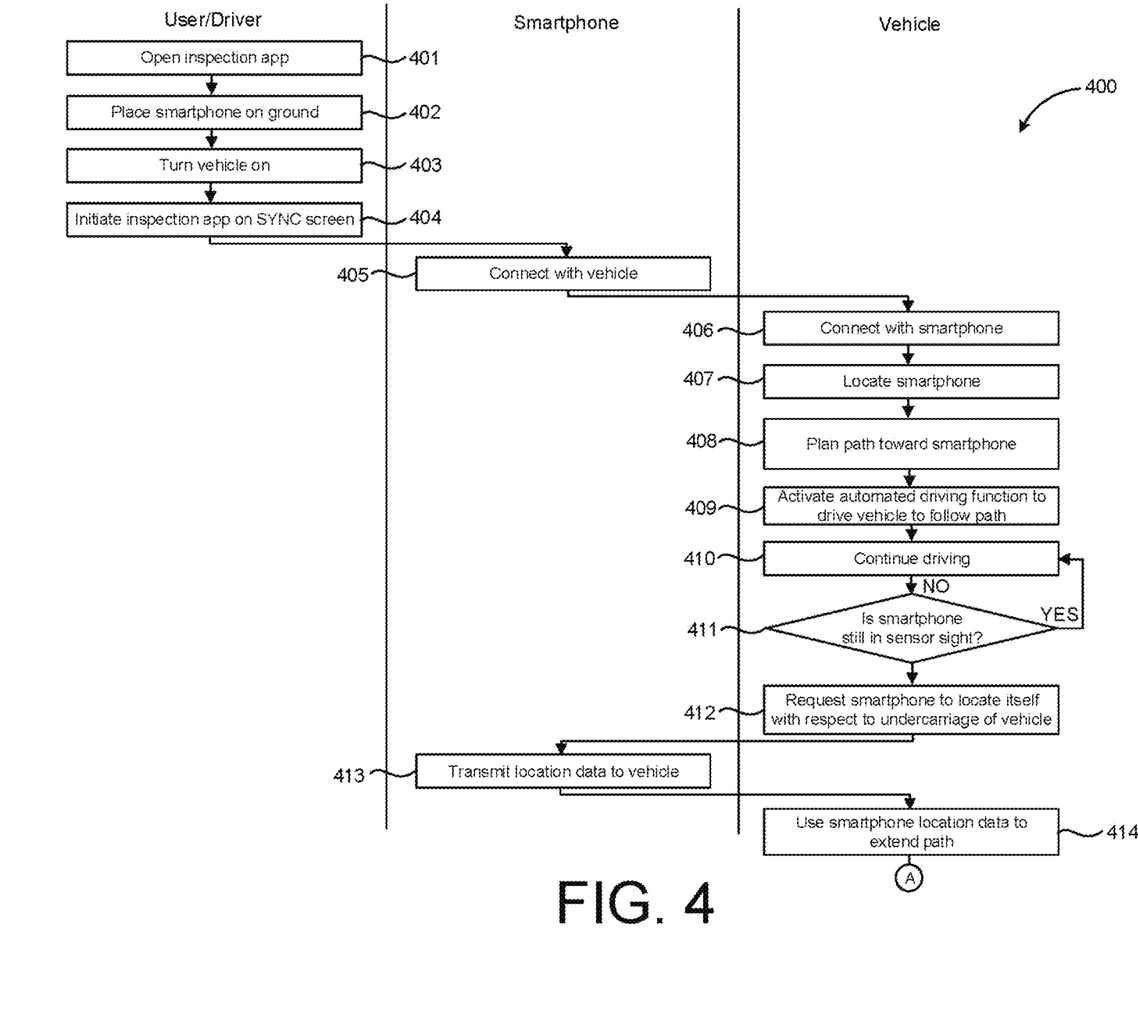
FIG. 4 is a flow chart illustrating exemplary steps for performing an undercarriage inspection of a self-driving vehicle with a smartphone in accordance with the principles of the present disclosure.

Referring now to FIG. 4, exemplary method 400 for performing an undercarriage inspection of self-driving vehicle 101 with mobile device 110 is provided. Method 400 is substantially similar to method 300, except that vehicle 101 is capable of driving itself to follow the path determined by vehicle path generation module 212, and does not require a driver. Specifically, at step 408, vehicle path generation module 212 may plan the path for vehicle 101 to follow to drive over mobile device 110. The plan need not be displayed on the HMI of vehicle 101. At step 409, the automatic driving function of vehicle 101 may be activated to drive vehicle 101 to follow the path over mobile device 110. At step 410, vehicle 101 may continue driving along the path until mobile device 110 is no longer in the sensor sight of vehicle 101.

Moreover, at step 419, vehicle 101 may continue driving itself at step 419 until vehicle 101 receives the termination signal from mobile device 110 at step 420. Upon receipt of the termination signal, at step 421, vehicle 101 may stop the automated driving function and stop driving.

Figure 6:
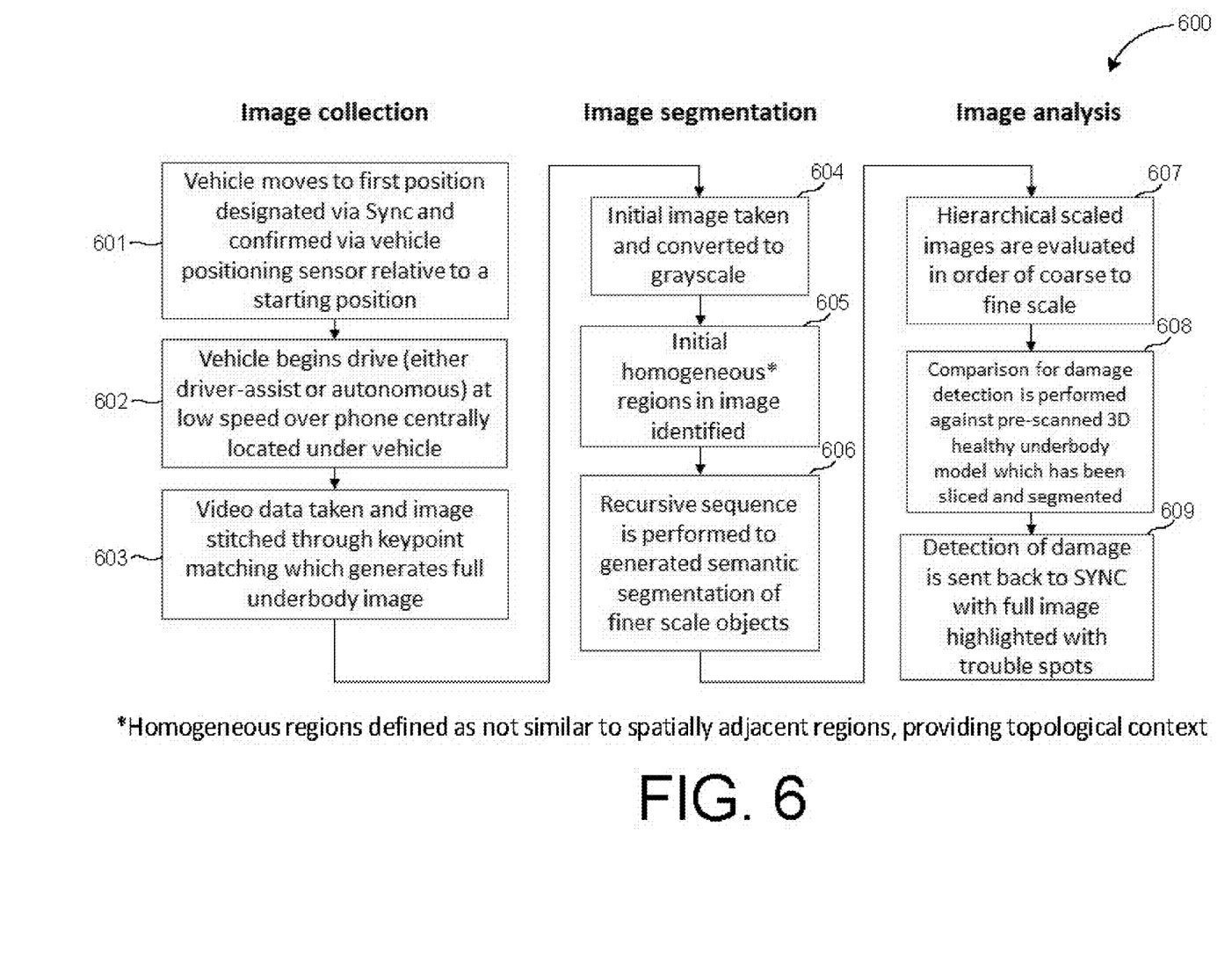
FIG. 6 is a flow chart illustrating exemplary steps for analyzing image data captured by the smartphone in accordance with the principles of the present disclosure.

Referring now to FIG. 6, exemplary method 600 for analyzing image data captured by mobile device 110 is described. During the image collection phase of the undercarriage inspection cycle, at step 601, vehicle 101 moves to a first position (via either manual driving or self-drive) to a starting position as designated via the HMI of the SYNC screen, and as confirmed via vehicle positioning sensors. At step 602, vehicle 101 beings to drive (via either manual driving, e.g., driver assist, or self-drive, e.g., autonomous) along the determined path over mobile device 110, preferably within a suggested speed, e.g., a low speed. At step 603, image data, e.g., video data, is captured by mobile device 110 as describe above, and processed, e.g., stitched through keypoint matching to generate a full image of undercarriage 104.

Next, during the image segmentation phase of the undercarriage inspection cycle, at step 604, the initial images captured by mobile device 110 may be converted to grayscale, e.g., by undercarriage inspection module 216. At step 605, initial homogenous regions, e.g., regions defined as not similar to spatially adjacent regions, in the image may be identified to provide topological context. At step 606, undercarriage inspection module 216 may perform recursive sequencing to generate semantic segmentation of finer scale objects within the image data.

Finally, during the image analysis phase of the undercarriage inspection cycle, at step 607, hierarchically scaled images may be evaluated in order of coarse to fine scale. At step 608, the images may be compared with pre-scanned 3D images/models of a healthy undercarriage, which has been sliced and segmented, to detect problems/damages to undercarriage 104. At step 609, data indicative of the detection of problems/damages to undercarriage 104 may be transmitted to vehicle 101 for display. For example, the full image of undercarriage 104 may be displayed with trouble spots highlighted as shown in FIGS. 5B and 5C.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A method for performing an inspection of an undercarriage of a vehicle with a smartphone, the method comprising:
   locating the smartphone on a surface via one or more sensors of the vehicle;
   generating, based on the locating of the smartphone, a path for the vehicle to drive over the smartphone;
   driving the vehicle to follow the path;
   receiving image data indicative of the undercarriage of the vehicle from the smartphone; and
   displaying the image data to facilitate undercarriage inspection of the vehicle.

2. The method of claim 1, wherein driving the vehicle to follow the path comprises manually driving the vehicle by a driver of the vehicle.

3. The method of claim 2, further comprising displaying the path on a display of the vehicle to facilitate manual driving of the vehicle by the driver.

4. The method of claim 1, wherein driving the vehicle to follow the path comprises automatically driving the vehicle.

5. The method of claim 1, wherein displaying the image data comprises displaying the image data on a display of the vehicle.

6. The method of claim 1, wherein displaying the image data comprises displaying the image data on a display of the smartphone.

7. The method of claim 1, further comprising positioning the smartphone on the ground.

8. The method of claim 1, further comprising operatively coupling the vehicle to the smartphone.

9. The method of claim 1, further comprising:
   requesting location data of the smartphone when the smartphone is out of range of the one or more sensors of the vehicle; and
   adjusting the path based on the location data of the smartphone.

10. The method of claim 1, further comprising analyzing the image data indicative of the undercarriage of the vehicle to identify one or more issues of the undercarriage.

11. The method of claim 10, further comprising receiving the data indicative of the one or more issues of the undercarriage from the smartphone.

12. The method of claim 11, wherein displaying the image data to facilitate undercarriage inspection of the vehicle comprises displaying the data indicative of the one or more issues of the undercarriage.

13. The method of claim 1, further comprising transmitting the image data indicative of the undercarriage of the vehicle to an inspection professional.

14. The method of claim 1, further comprising:
receiving a termination signal from the smartphone when the image data received from the smartphone indicates that the vehicle is past the smartphone; and
stopping the vehicle.

15. A system for performing an inspection of an undercarriage of a vehicle with a smartphone, the system comprising:
one or more sensors operatively coupled to the vehicle, the one or more sensors configured to detect the smartphone and generate data indicative of the detection of the smartphone;
a memory that stores computer-executable instructions; and
a processor configured to access the memory and execute the computer-executable instructions to:
locate the smartphone on a ground based on the data indicative of the detection of the smartphone;
generating, based on the locating of the smartphone, a path for the vehicle to drive over the smartphone;
receive image data indicative of the undercarriage of the vehicle from the smartphone; and
cause a display to display the image data indicative of the undercarriage of the vehicle.

16. The system of claim 15, wherein the image data indicative of the undercarriage of the vehicle received from the smartphone comprises analyzed data indicative of one or more issues of the undercarriage.

17. The system of claim 15, wherein the processor is further configured to cause a display of the vehicle to display the image data indicative of the undercarriage of the vehicle.

18. The system of claim 15, wherein the processor is further configured to cause the vehicle to drive to follow the path.

19. The system of claim 15, wherein the processor is further configured to:
request location data of the smartphone when the smartphone is out of range of the one or more sensors of the vehicle; and
adjust the path based on the location data of the smartphone.

20. The system of claim 15, wherein the processor is further configured to transmit the image data indicative of the undercarriage of the vehicle to an inspection professional.

* * * * *